(12) United States Patent
Nishita

(10) Patent No.: US 12,152,880 B2
(45) Date of Patent: Nov. 26, 2024

(54) SURVEYING SYSTEM, POINT CLOUD DATA ACQUIRING METHOD, AND POINT CLOUD DATA ACQUIRING PROGRAM

(71) Applicant: TOPCON CORPORATION, Tokyo-to (JP)

(72) Inventor: Nobuyuki Nishita, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 428 days.

(21) Appl. No.: 17/704,076

(22) Filed: Mar. 25, 2022

(65) Prior Publication Data

US 2022/0307833 A1  Sep. 29, 2022

(30) Foreign Application Priority Data

Mar. 29, 2021  (JP) .................................. 2021-055468

(51) Int. Cl.
*G01C 15/00*  (2006.01)
*G01C 11/02*  (2006.01)

(52) U.S. Cl.
CPC ............ *G01C 15/002* (2013.01); *G01C 11/02* (2013.01)

(58) Field of Classification Search
CPC .................................................. G01C 15/002
USPC .................................. 33/228, 286, 290–296
See application file for complete search history.

(56) References Cited

U.S. PATENT DOCUMENTS

| | | | |
|---|---|---|---|
| 7,633,610 B2* | 12/2009 | Walser ...................... | G01C 1/04 356/141.5 |
| 9,336,629 B2* | 5/2016 | Finn ...................... | H04N 13/275 |
| 10,145,671 B2* | 12/2018 | Khatuntsev .......... | G01C 15/006 |
| 11,004,250 B2* | 5/2021 | Yasutomi ................ | G06T 15/00 |
| 11,580,696 B2* | 2/2023 | Sasaki ..................... | G01S 17/42 |
| 11,822,351 B2* | 11/2023 | Nishita ................... | G06T 17/05 |
| 11,933,611 B2* | 3/2024 | Sasaki .................... | G01C 15/06 |

(Continued)

FOREIGN PATENT DOCUMENTS

| | | |
|---|---|---|
| JP | 2016-223841 A | 12/2016 |
| JP | 2017-223540 A | 12/2017 |

(Continued)

OTHER PUBLICATIONS

European communication dated Aug. 23, 2022 in corresponding European patent application No. 22164045.1.

*Primary Examiner* — George B Bennett
(74) *Attorney, Agent, or Firm* — Nields, Lemack & Frame, LLC

(57) ABSTRACT

A surveying system comprises a target and a measuring instrument. The target has retro-reflection characteristics, the measuring instrument comprises a point measuring unit for irradiating a distance measuring light, for receiving a reflected light and for measuring three-dimensional coordinates of the target based on a light receiving result, a scanner unit for rotatably irradiating a laser beam and for acquiring the point cloud data and an arithmetic control module, wherein the point measuring unit measures the target held in the vicinity of an object, the arithmetic control module calculates a region of a three-dimensional space including the object based on a target measurement result of the point measuring unit, the scanner unit scans a predetermined range including the object and acquires the point cloud data, and the arithmetic control module selects the point cloud data only included in the region of the point cloud data.

22 Claims, 12 Drawing Sheets

(56) References Cited

U.S. PATENT DOCUMENTS

| | | | |
|---|---|---|---|
| 2014/0247439 A1* | 9/2014 | Neier | G01S 17/87 |
| | | | 356/4.01 |
| 2016/0349051 A1 | 12/2016 | Kumagai et al. | |
| 2017/0168142 A1* | 6/2017 | Kumagai | G01S 17/66 |
| 2017/0363421 A1 | 12/2017 | Kumagai et al. | |
| 2018/0052232 A1 | 2/2018 | Ohtomo et al. | |
| 2019/0063922 A1 | 2/2019 | Ohtomo et al. | |
| 2019/0235062 A1* | 8/2019 | Zeng | G01S 7/4972 |
| 2020/0026310 A1 | 1/2020 | Nishita et al. | |
| 2022/0099442 A1* | 3/2022 | Eno | G05D 1/101 |
| 2023/0099779 A1* | 3/2023 | Redgewell | G01S 17/66 |
| | | | 356/614 |
| 2024/0151529 A1* | 5/2024 | Fonken | G01C 15/04 |

FOREIGN PATENT DOCUMENTS

| | | |
|---|---|---|
| JP | 2018-28464 A | 2/2018 |
| JP | 2019-39795 A | 3/2019 |
| JP | 2019-113507 A | 7/2019 |

* cited by examiner

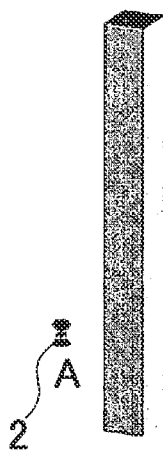 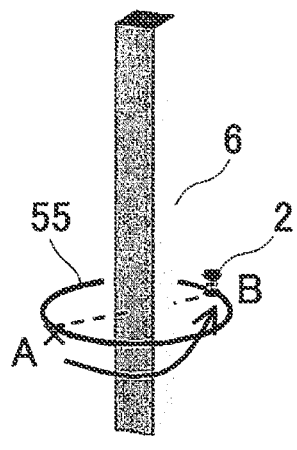 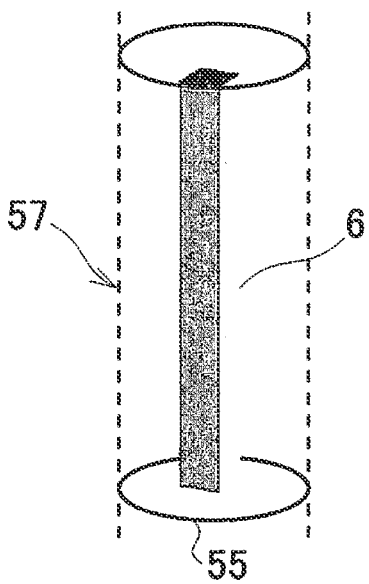
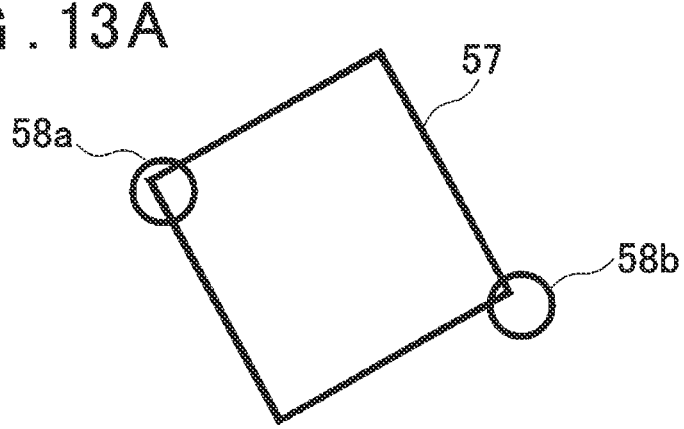
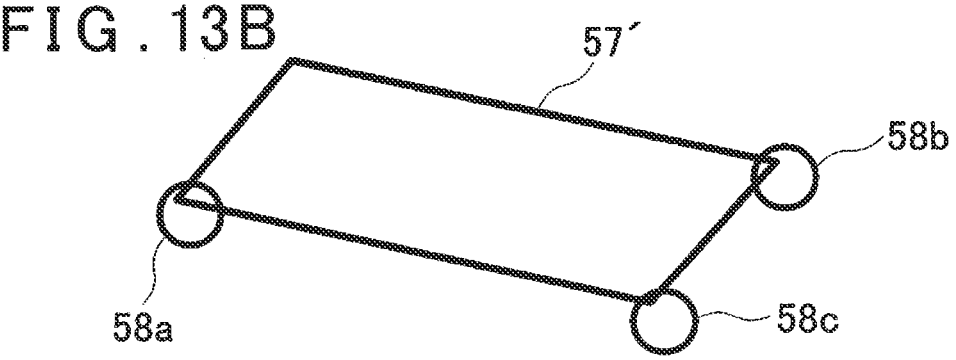

SURVEYING SYSTEM, POINT CLOUD DATA ACQUIRING METHOD, AND POINT CLOUD DATA ACQUIRING PROGRAM

BACKGROUND OF THE INVENTION

The present invention relates to a surveying system which can specify a point cloud data acquisition range of a laser scanner by a three-dimensional space, a point cloud data acquiring method, and a point cloud data acquiring program.

Generally, in case of acquiring the point cloud data by a laser scanner, a pulsed distance measuring light is vertically rotated around a horizontal axis and further is horizontally rotated around a vertical axis, thereby an omnidirectional scan is performed, and the point cloud data is acquired. As a result, an amount of data acquired is enormous. However, the point cloud data which a measurer actually needs relates to an object present within a limited range in a total scan range.

In the measurement using a scanner in a place where there is something other than an object of which the point cloud data is to be acquired, the data processing work to exclude unnecessary parts from the acquired point cloud data is required after the measurement, thereby the efficiency is reduced.

Further, since the amount of data is enormous, the data processing such as extracting the point cloud data concerning the object becomes the post-processing after acquiring the point cloud data, and it is difficult to proceed with the work while checking the situation on a job site.

It is to be noted that, in acquiring the point cloud data, a horizontal direction range and a vertical direction range are set, and the point cloud data is acquired in the set ranges, but the point cloud data is acquired with respect to all physical objects present in a depth direction, and hence it is inevitable that an amount of data becomes enormous.

Further, in case of displaying an acquired point cloud data in a display device and confirming an object, a measuring point whose distance is different from a distance of the object is also displayed, and hence it is difficult to identify the object.

SUMMARY OF INVENTION

It is an object of the present invention to provide a surveying system which enables specifying a point cloud data acquisition range of a laser scanner by a three-dimensional space and reduces an amount of the point cloud data to be acquired, a point cloud data acquiring method, and a point cloud data acquiring program.

To attain the object as described above, a surveying system according to the present invention is a surveying system comprising a target and a measuring instrument, wherein the target has retro-reflection characteristics, the measuring instrument comprises a point measuring unit configured to irradiate a distance measuring light to the target, to receive a reflected light and to measure three-dimensional coordinates of the target based on a light receiving result, a scanner unit configured to rotatably irradiate a laser beam and to acquire a point cloud data, and an arithmetic control module, wherein the point measuring unit is configured to measure the target held in the vicinity of an object at at least one position, the arithmetic control module is configured to calculate a region of a three-dimensional space including the object based on a target measurement result of the point measuring unit, the scanner unit is configured to scan a predetermined range including the object and to acquire the point cloud data, and the arithmetic control module is configured to select a point cloud data only included in the region of the point cloud data.

Further, in the surveying system according to a preferred embodiment, wherein the point measuring unit has a tracking function and tracks a movement of the target around the object, measures the target while tracking and acquires a tracking locus, and the arithmetic control module is configured to calculate the region of the three-dimensional space based on the tracking locus.

Further, in the surveying system according to a preferred embodiment, wherein the point measuring unit has a tracking function and tracks a movement of the target around the object, measures the target while tracking and acquires a tracking locus, and the arithmetic control module is configured to calculate a horizontal projection figure of the tracking locus and calculate a region of the three-dimensional space with the horizontal projection figure as a bottom plane and extending in the vertical direction.

Further, in the surveying system according to a preferred embodiment, wherein the point measuring unit has a tracking function and tracks a movement of the target around the object, measures the target while tracking and acquires a tracking locus, and the arithmetic control module is configured to determine the tracking locus as a boundary, set a height vertically above the tracking locus, and calculate a region of the three-dimensional space.

Further, in the surveying system according to a preferred embodiment, wherein the arithmetic control module is configured to calculate a circle inscribed or circumscribed to the tracking locus and to calculate the region of the three-dimensional space based on the inscribed or circumscribed circle.

Further, in the surveying system according to a preferred embodiment, wherein the arithmetic control module is configured to calculate a polygon inscribed or circumscribed to the tracking locus and to calculate the region of the three-dimensional space based on the inscribed or circumscribed polygon.

Further, in the surveying system according to a preferred embodiment, wherein the arithmetic control module has a region pattern for setting a region, and the point measuring unit is adapted to measure three-dimensional coordinates of the target as a region point at at least one point in the vicinity of the object, and the arithmetic control module is configured to calculate the region of the three-dimensional space based on a measurement result of the region point and the region pattern.

Further, in the surveying system according to a preferred embodiment, the region pattern is a circle, and the arithmetic control module is configured to determine one region point as a center of the circle and to calculate the region of the three-dimensional space based on a set radius and the region point.

Further, in the surveying system according to a preferred embodiment, wherein the region pattern is a circle, and the arithmetic control module is configured to calculate a distance between two region points from horizontal coordinates of the two region points and to calculate the region of the three-dimensional space with the calculated distance determined as a diameter of the circle.

Further, in the surveying system according to a preferred embodiment, wherein the region pattern is a circle, and the arithmetic control module is configured to determine one point of two region points as a center of the circle, to calculate a distance between two region points from horizontal coordinates, to determine the calculated distance as a radius of the circle and to calculate the region of the three-dimensional space.

Further, in the surveying system according to a preferred embodiment, wherein the region pattern is a square, and the arithmetic control module is configured to calculate a distance between two points from horizontal coordinates of the two points, to determine the calculated distance as a diagonal line of the square and to calculate the region of the three-dimensional space.

Further, in the surveying system according to a preferred embodiment, wherein the point measuring unit is adapted to measure three-dimensional coordinates of the target as region points at at least three points in the vicinity of the object, the region pattern is a rectangle, and the arithmetic control module is configured to determine horizontal coordinates of the three points as coordinates of three vertexes of the rectangle, to calculate the rectangle and to calculate the region of the three-dimensional space based on the calculated rectangle.

Further, in the surveying system according to a preferred embodiment, wherein the point measuring unit has a tracking function, tracks the movement of the target along the object, measures the target while tracking and acquires a tracking locus, and the region pattern is a sphere, and wherein the arithmetic control module is configured to set region points on the tracking locus, determine the region points as centers of the spheres, and to calculate the region of the three-dimensional space by a gathering of spheres formed along the tracking locus.

Further, in the surveying system according to the preferred embodiment, wherein the arithmetic control module has a plurality of region patterns, the point measuring unit is adapted to measure three-dimensional coordinates of the target as a region point at at least two points in the vicinity of the object, and wherein the arithmetic control module is configured to select one of a plurality of region patterns and to calculate the region of the three-dimensional space based on a measurement result of the region point and the selected region pattern.

Further, in the surveying system according to a preferred embodiment, wherein a plurality of region patterns include at least a circular pattern, a square pattern, a rectangular pattern, and a spherical pattern.

Further, in the surveying system according to a preferred embodiment, wherein the scanner unit is adapted to perform a scan in such a manner that a plurality of objects are included and to acquire the point cloud data, and the arithmetic control module is configured to set the region of the three-dimensional space for each of said objects and to select only the point cloud data included within the region.

Further, in the surveying system according to a preferred embodiment, a remote controller is further included, at least one of the remote controller or the point measuring unit has a display unit, and the point cloud data included in the region is displayed on the display unit.

Further, in the surveying system according to a preferred embodiment, wherein the point cloud data displayed on the display unit concerns one of the plurality of objects.

Further, in the surveying system according to a preferred embodiment, wherein the display unit is a touch panel and the measurement of the objects is enabled based on the displayed point cloud data.

Further, in the surveying system according to a preferred embodiment, a UAV is further included, and the target is an omnidirectional prism provided on the UAV.

Further, a point cloud data acquiring method according to the present invention includes, in a surveying system which comprises a target and a measuring instrument, wherein the target has a retro-reflection characteristics and the measuring instrument has a point measuring unit capable of measuring three-dimensional coordinates of the target while tracking the target and a scanner unit which is integrated with the point measuring unit and is capable of acquiring a point cloud data by rotatably irradiating a laser beam, the point cloud data acquiring method comprises steps of moving the target around an object, acquiring three-dimensional coordinates of the target at least one position while moving, calculating a closed stereoscopic region of a three-dimensional space including the object based on the single three-dimensional coordinates, acquiring the point cloud data including the closed stereoscopic region by the scanner unit, and selecting only point cloud data included in the closed stereoscopic region in the point cloud data.

Furthermore, a point cloud data acquiring program according to the present invention makes the surveying system described above to execute each of the steps.

According to the present invention, the surveying system comprises a target and a measuring instrument, wherein the target has the retro-reflection characteristics, the measuring instrument comprises a point measuring unit configured to irradiate a distance measuring light to the target, to receive a reflected light and to measure three-dimensional coordinates of the target based on a light receiving result, a scanner unit configured to rotatably irradiate a laser beam and to acquire the point cloud data, and an arithmetic control module, wherein the point measuring unit is configured to measure the target held in the vicinity of an object at at least one position, the arithmetic control module is configured to calculate a region of a three-dimensional space including the object based on a target measurement result of the point measuring unit, the scanner unit is configured to scan a predetermined range including the object and to acquire the point cloud data, and the arithmetic control module is configured to select the point cloud data only included in the region of the point cloud data. As a result, the point cloud data with respect to the object can be acquired, an amount of the point cloud data to be acquired can be reduced, the data processing work to exclude an unnecessary part from the acquired point cloud data is omitted after the measurement, the workability can be improved, and the identification of the object can be facilitated.

BRIEF DESCRIPTION OF DRAWINGS

FIG. 12A and FIG. 12B are explanatory drawings of specifying two points and determining a diameter of a circle as the data acquisition region when the object is a support column, and FIG. 12C is an explanatory drawing of further specifying a height and determining the data acquisition region of a three-dimensional space.

FIGS. 13A-13B show a case where the data acquisition region is specified using a pattern, where FIG. 13A is an explanatory drawing of a case where a square pattern is used and two points are specified, and FIG. 13B is an explanatory drawing of a case where a rectangular pattern is used and three points are specified.

DETAILED DESCRIPTION OF THE PREFERRED EMBODIMENT

A description will be given below on embodiments of the present invention by referring to the attached drawings.

A surveying system according to the embodiment of the present invention includes a measuring instrument, a remote controller and a target. As the measuring instrument, a measuring instrument is used, which has a function of tracking the target and of enabling a measurement of a three-dimensional position of the target and a function of performing a two-dimensional scan and of enabling an acquisition of a point cloud data.

As such a measuring instrument, there are a surveying instrument disclosed in Japanese Patent Application Publication No. 2016-223841, a laser scanner disclosed in Japanese Patent Application Publication No. 2018-28464, and the like.

In the present embodiment, in a measuring instrument which is capable of tracking and measuring a target and is capable of acquiring a point cloud data, a plurality of three-dimensional positions of an actual space are specified with the use of the target before acquiring or after acquiring a point cloud data, and a region of a closed three-dimensional space (a closed stereoscopic region) including an object is created based on the plurality of specified three-dimensional positions.

First, a description will be given on an outline of the present embodiment by referring to FIG. 1.

Figure 1:
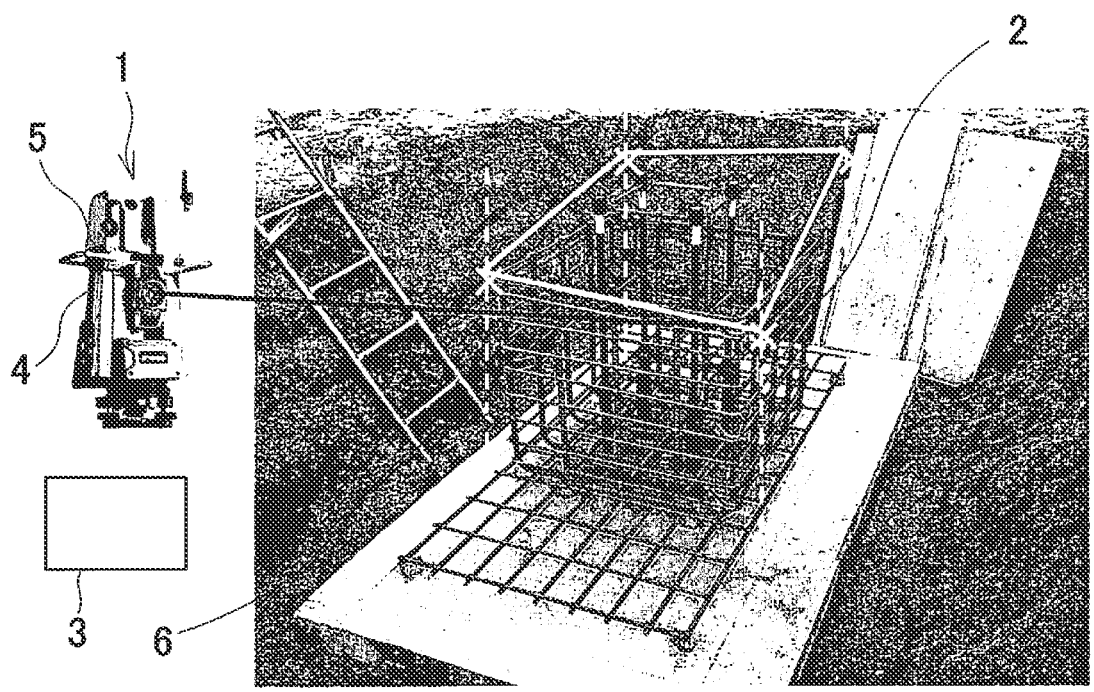
FIG. 1 is an explanatory drawing of an entire surveying system according to an embodiment of the present invention.

In FIG. 1, reference numeral 1 denotes a measuring instrument, reference numeral 2 denotes a target as a retroreflector such as a prism, and reference numeral 3 denotes a remote controller.

The measuring instrument 1 is installed at a predetermined position, e.g., a known position with respect to an object. The measuring instrument 1 has a point measuring unit 4 and a scanner unit 5, and the point measuring unit 4 and the scanner unit 5 are integrated.

The point measuring unit 4 has a function to track the target 2 and to measure three-dimensional coordinates of the target 2 of the moment in real time. As the point measuring unit 4, a total station or the like is included.

The scanner unit 5 has a function to acquire the point cloud data by scanning with a pulsed distance measuring light. As the scanner unit 5, one which rotatably irradiate the pulsed distance measuring light on one horizontal axis, one which rotatably irradiate the same on two axes which are horizontal and vertical axes, one which performs a scan with the pulsed distance measuring light back and forth in horizontal/vertical directions, and others.

The target 2 may be an omnidirectional prism mounted on a pole, or an omnidirectional prism mounted on a handle for easy carrying.

FIG. 1 shows reinforcing bars of a column in an earlier stage of the assembling as the object 6.

A measurement worker holds the target 2 and moves around the object 6. The point measuring unit 4 tracks the target 2 and measures three-dimensional coordinates of the target 2 on predetermined points. It is to be noted that the three-dimensional coordinates on the predetermined points are coordinates of points at which a moving direction changes, namely, coordinates of corners. It is to be noted that the predetermined points may be selected from a locus which circles the object 6 and three-dimensional coordinates of the predetermined points may be determined. Further, the target 2 is raised on the rear side of the object 6 in order to prevent a tracking light from being blocked by the object 6.

In the present embodiment, the number of predetermined points is four in correspondence with a shape of the object 6. A horizontal projection figure of a figure as formed by four points (the figure projected onto the horizontal plane) is set as a cross section, and a three-dimensional space extending vertically is set as a point cloud data acquisition region (which will be referred to as a data acquisition region or a region hereinafter). It is to be noted that, if the object is finite in the vertical direction and a height of the object is known, the height may also be specified, and the data acquisition region of the closed three-dimensional space (closed stereoscopic region) may be specified. Since the three-dimensional coordinates of the four points are known, a boundary of the data acquisition region is also known.

As to the acquisition of the point cloud data by the scanner unit 5, a scan may be performed in a wide range including the object as a preceding step of setting the region or, after setting a region relative to the object, a scan may be performed in the set region alone, and the point cloud data may be acquired.

After acquiring the point cloud data, by judging whether or not measured values (three-dimensional coordinates) of the point cloud data are included in the data acquisition region of which the boundary is set as a threshold, it is possible to extract the point cloud data of the data acquisition region, to identify the object from the extracted point cloud data, and to easily extract the point cloud data with respect to the object.

It is to be noted, in case of acquiring a point cloud data in a wide range, if a plurality of objects are present in the point cloud data acquisition region, by acquiring the point cloud data at one time, then subsequent operation becomes only a region setting, which results in the good work efficiency. Further, if the number of object is one, by scanning only in an area of the object, it is possible to reduce a data amount, which is effective.

A further description will be given on the measuring instrument 1 with reference to FIG. 2, FIG. 3, FIG. 4, and FIG. 5.

Figure 2:
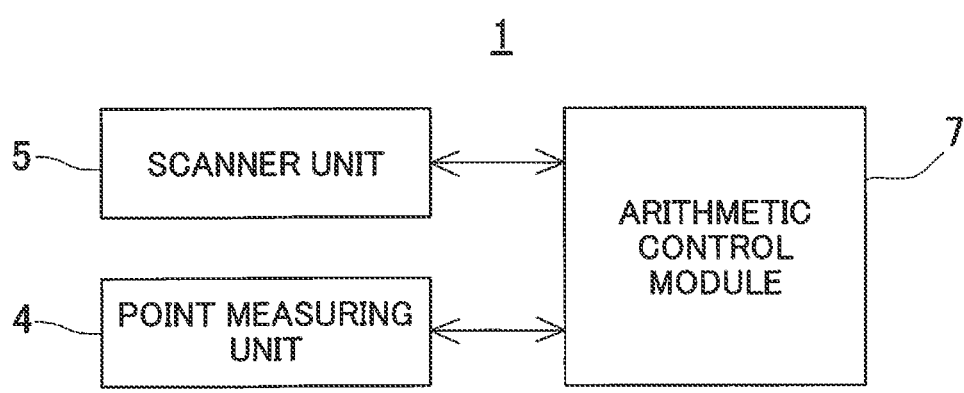
FIG. 2 is a schematic view of the entire surveying system.

In the measuring instrument 1 shown in FIG. 2, a total station is used as the point measuring unit 4, and a uniaxial rotation irradiation type laser scanner, which rotatably irradiates a laser beam around a horizontal rotation shaft as a center, is used as the scanner unit 5.

The surveying system 1 includes the point measuring unit 4 (which will be referred to as a TS unit 4 hereinafter), the scanner unit 5 (which will be referred to as an LS unit 5 hereinafter) as a two-dimensional laser scanner, and an arithmetic control module 7. The arithmetic control module 7 integrally controls an operation of the TS unit 4 and an operation of the LS unit 5, and performs a data processing such as a matching of the data acquired by the TS unit 4 and the LS unit 5 and correction. It is to be noted that any one of a TS arithmetic control module 21 (which will be described later) provided in the TS unit 4 and an LS arithmetic control module 38 (which will be described later) provided in the LS unit 5 may be allowed to also serve as the arithmetic control module 7.

A tripod 8 is installed at a predetermined position, the TS unit 4 is provided on the tripod 8, and the LS unit 5 is provided on an upper surface of the TS unit 4.

The TS unit 4 has a first machine reference point (not shown), the TS unit 4 and the LS unit 5 are constituted in such a manner that a second machine reference point of the LS unit 5 is present on a vertical line 9 running through the first machine reference point, and a distance between the first machine reference point and the second machine reference point is known.

First, a description will be given on an outline configuration of the TS unit 4.

A lower end portion of the TS unit 4 is a base unit 11 with a leveling function, and a horizontal rotation driver 12 is accommodated in the base unit 11. The horizontal rotation driver 12 has a horizontal rotation shaft 13 which extends vertically, and an axis of the horizontal rotation axis 13 coincides with the vertical line 9.

A frame unit 14 which is a horizontal rotation unit is mounted on an upper end of the horizontal rotation shaft 13. The LS unit 5 is provided on an upper surface of the frame unit 14.

A telescope module 16 which is a vertical rotation unit is rotatably supported on the frame unit 14 via a vertical rotation shaft 15.

A telescope 17 with a distance measuring optical axis is provided in the telescope module 16, and a TS distance measuring module 22 (which will be described later) and the like are provided in the telescope module 16. The distance measuring optical axis crosses the vertical line 9 and is orthogonal to an axis of the vertical rotation shaft 15. An intersection of the distance measuring optical axis and the vertical line 9 may be a first machine reference point.

A vertical rotation driver 18 is accommodated in the frame unit 14, and the vertical rotation driver 18 is connected to the vertical rotation shaft 15. The telescope module 16 is rotated in the vertical direction via the vertical rotation shaft 15 by the vertical rotation driver 18. A vertical angle detector 19 is provided on the vertical rotation shaft 15, a vertical rotation angle of the vertical rotation shaft 15 is detected by the vertical angle detector 19 in real time, and further a vertical angle of the telescope module 16 (i.e., the distance measuring optical axis) is detected.

The frame unit 14 is rotated in a horizontal direction over a total circumference by the horizontal rotation driver 12 via the horizontal rotation shaft 13. Further, a horizontal angle detector 20 is provided on the horizontal rotation shaft 13, a horizontal rotation angle of the frame unit 14 (i.e., a horizontal angle of the distance measuring optical axis) is detected by the horizontal angle detector 20, and a horizontal angle of the frame unit 14 is detected in real time.

The horizontal rotation driver 12 and the vertical rotation driver 18 constitute a rotation driver, and the telescope module 16 is rotated in a necessary state in two directions of vertical and horizontal directions. Further, the vertical angle detector 19 and the horizontal angle detector 20 constitute a direction angle detector and the direction angle detector is adapted to detect a vertical angle and a horizontal angle (i.e., a direction angle of the distance measuring optical axis) in real time.

A total station arithmetic control module (which will be referred to as a TS arithmetic control module) 21 is provided in the frame unit 14.

Figure 4:
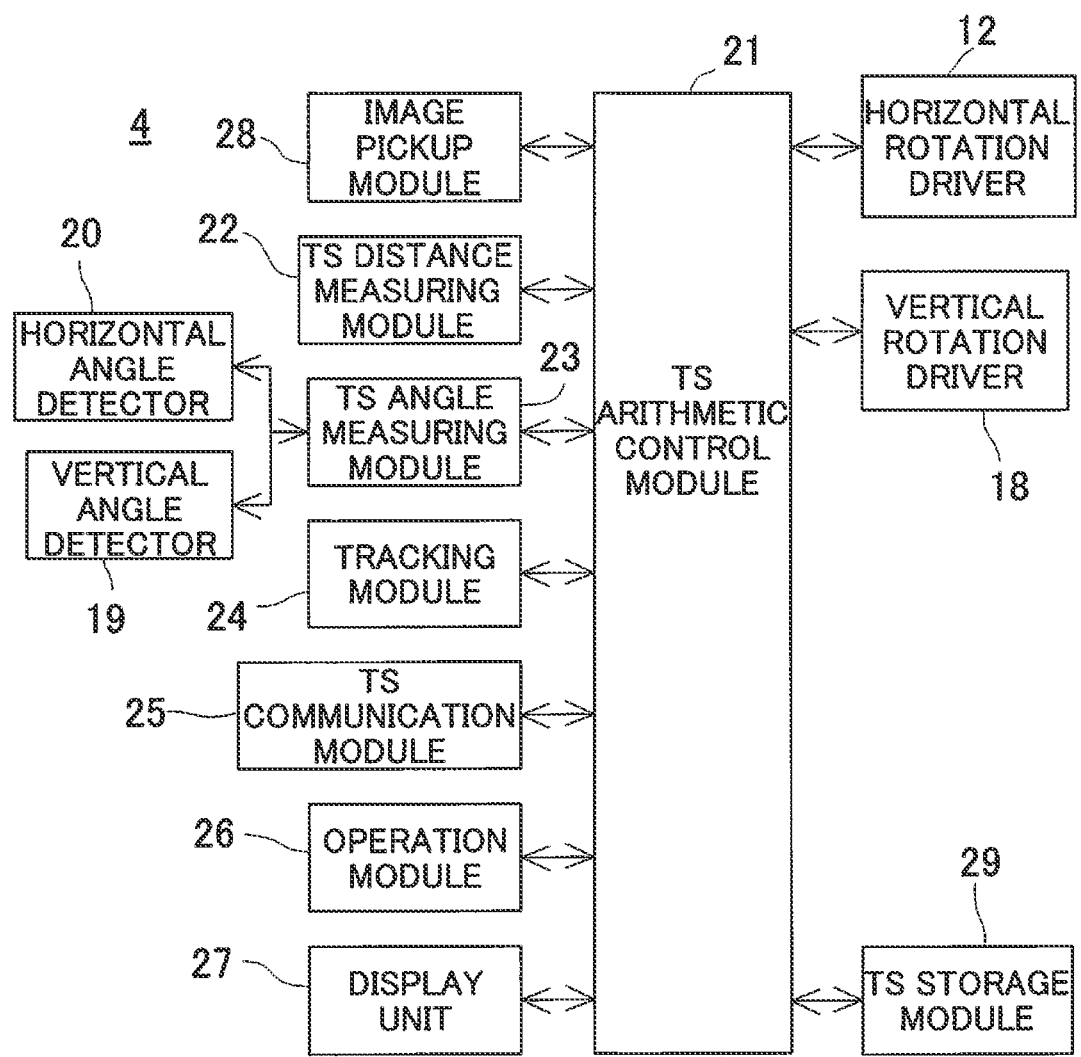
FIG. 4 is a schematic block diagram of a point measuring unit of the surveying a system.

A Further description will be given on the TS unit 4 with reference to FIG. 4.

Figure 3:
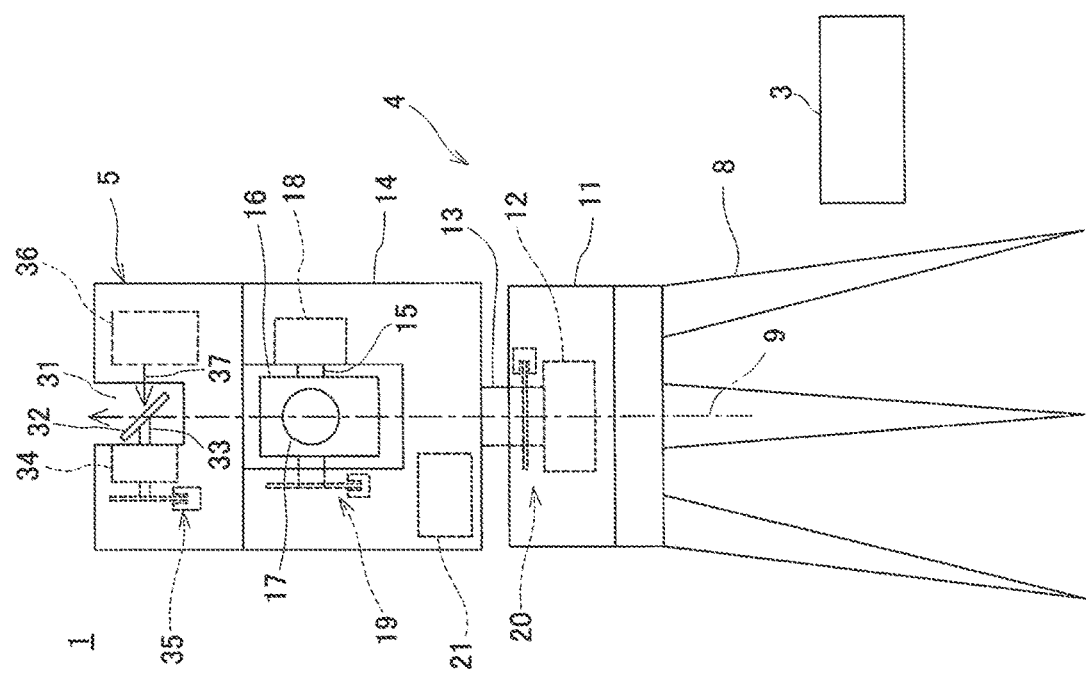
FIG. 3 is a schematic view of the surveying system.

As shown in FIG. 3, the TS unit 4 is mainly constituted of a total station distance measuring module (which will be referred to as a TS distance measuring module) 22, a total station angle measuring module (which will be referred to as a TS angle measuring module) 23, a tracking module 24, a TS communication module 25, an operation module 26, a display unit 27, an image pickup module 28, a total station storage module (which will be referred to as a TS storage module) 29, the TS arithmetic control module 21, the horizontal rotation driver 12, and the vertical rotation driver 18. The TS angle measuring module 23 is constituted of the horizontal angle detector 20 and the vertical angle detector 19. It is to be noted that encoders may be used as the horizontal angle detector 20 and the vertical angle detector 19.

The TS distance measuring module 22, the horizontal rotation driver 12, the vertical rotation driver 18, the TS angle measuring module 23, the tracking module 24, the TS communication module 25, the display unit 27, the image pickup module 28, and the like are controlled by the TS arithmetic control module 21.

The TS distance measuring module 22 projects a distance measuring light to the target 2, receives a reflected light from the target 2, performs the distance measurement, and inputs a distance measurement result to the TS arithmetic control module 21.

The TS angle measuring module 23 obtains a horizontal angle and a vertical angle of the target 2 (a measuring point) at measuring distance based on a detection result from the vertical angle detector 19 and a detection result from the horizontal angle detector 20, and inputs detected angles to the TS arithmetic control module 21.

The TS arithmetic control module 21 calculates three-dimensional coordinates of distance measuring points based on a distance measurement result of the TS distance measuring module 22 and an angle measurement result of the TS angle measuring module 23, and stores arithmetic results in the TS storage module 29.

The tracking module 24 projects a tracking light coaxially with or in parallel with the distance measuring light, receives a reflected light from the target 2, and inputs a tracking state to the TS arithmetic control module 21.

The TS arithmetic control module 21 drives and controls the horizontal rotation driver 12 and the vertical rotation driver 18 in such a manner that the reflected light from the target 2 is always received by the tracking module 24 and the telescope 17 sights the target 2 in a case where the target 2 moves.

The image pickup module 28 acquires an image (a background image) of a measuring direction including an object and inputs an image data to the TS arithmetic control module 21. The TS arithmetic control module 21 associates the image data with the distance measurement and the angle measurement data and stores in the TS storage module 29. Alternatively, the TS arithmetic control module 21 performs an image processing such as superimposing the image data and the point cloud data acquired by the LS unit 5.

The TS communication module 25 receives an operation instruction from the remote controller 3, or transmits or receives controls signals and the data, e.g., the measurement data of the TS unit 4 (a distance measurement result of the TS distance measuring module 22, an angle measurement result of the TS angle measuring module 23), an image data acquired by the image pickup module 28, and the point cloud data acquired by the LS unit 5.

From the operation module 26, measurement conditions or operation instruction, e.g., start the measurement for the TS unit 4 or the LS unit 5 are input, and on the display unit 27, the measurement conditions, measurement situations, measurement results, and the like are displayed. It is to be noted that a touch panel may be adopted as the display unit 27, the display unit can also serve as the operation module and the operation module 26 may be omitted.

In the TS storage module 29, various types of programs are stored. These programs include: an image pickup program for controlling the image acquisition by the image pickup module 28, a distance measurement program for controlling the distance measurement by the TS distance measuring module 22, an angle measurement program for calculating a direction angle based on the acquisition of the horizontal angle detection and the vertical angle detection by the TS angle measuring module 23 and a result of the angle detection, a tracking program for performing the tracking by the tracking module 24, an image processing program for processing images acquired by the image pickup module 28, a region setting program for setting a region of a three-dimensional space including an object based on a plurality of specified three-dimensional positions (three-dimensional coordinates), a point cloud data extraction program for determining whether the point cloud data acquired by the LS unit 5 is within a data acquisition region and for extracting the point cloud data within the data acquisition region or for eliminating the point cloud data outside the data acquisition region, a data association program for performing a synchronization or an association between the data, a region pattern for setting a region of a three-dimensional space, or the like.

Further, a data storage section is formed in the TS storage module 29, and in the data storage section, data, for instance, the image data acquired by the image pickup module 28, the distance measurement data acquired by the TS distance measuring module 22 and the angle measurement data acquired by the TS angle measuring module 23 are stored.

The image data, the point cloud data, the distance measurement data and the angle measurement data are associated with each other.

The TS arithmetic control module 21 executes the programs stored in the TS storage module 29, performs necessary calculations based on the stored data, performs the necessary control, e.g., the distance measurement, the angle measurement, or the tracking based on the stored programs.

As shown in FIG. 3, the LS unit 5 has a recess portion 31 formed at the center, and a scanning mirror 32 is accommodated in the recess portion 31. The scanning mirror 32 is rotatably supported by a scanning rotation shaft 33 with a horizontal axis, and is configured to rotate by a scanning motor 34 via the scanning rotation shaft 33.

Further, a laser scanner vertical angle detector (which will be referred to as an LS vertical angle detector) 35 is provided on the scanning rotation shaft 33. The LS vertical angle detector 35 is configured to detect a rotation angle (a vertical angle, i.e., a rotation angle of the scanning mirror 32) of the scanning rotation shaft 33 in real time. It is to be noted that an encoder may be used as the LS vertical angle detector 35.

The LS unit 5 includes an LS distance measuring module 36 in a part facing the scanning mirror 32. A scanning light (a pulsed laser beam) 37 is projected from the LS distance measuring module 36 toward the scanning mirror 32.

An optical axis of the scanning light 37 coincides with an axis of the scanning rotation shaft 33 and is deflected at a right angle by the scanning mirror 32. By rotating the scanning mirror 32 around the scanning rotation shaft 33, the scanning light 37 as deflected by the scanning mirror 32 rotatably irradiates within a plane orthogonal to the axis of the scanning rotation shaft 33. An intersection of the axis of the scanning rotation shaft 33 (i.e., an optical axis of the scanning light 37) and the scanning mirror 32 is a second machine reference point of the LS unit 3.

The scanning light 37 as rotatably irradiated scans an object, a reflected scanning light 37' (not shown) as reflected on the object enters the LS distance measuring module 36 via the scanning mirror 32. By receiving the reflected scanning light 37' in the LS distance measuring module 36, a reciprocating time (a flying time) of the pulsed light is obtained and the distance measurement (Time of Flight) is performed with respect to each pulsed light based on the light speed and the flying time.

Further, a vertical angle of the scanning mirror 32 is detected by the LS vertical angle detector 35 in real time, the distance measurement is performed with respect to each pulsed light, and a vertical angle is detected with respect to each pulsed light.

Since the LS unit 3 rotatably irradiates the scanning light 37 in the vertical direction and detects a vertical angle, two-dimensional point cloud data with two-dimensional coordinates consisted of a distance and a vertical angle is acquired. The acquired two-dimensional point cloud data is stored in a laser scanner storage module via a laser scanner arithmetic control module (which will be described later).

Figure 5:
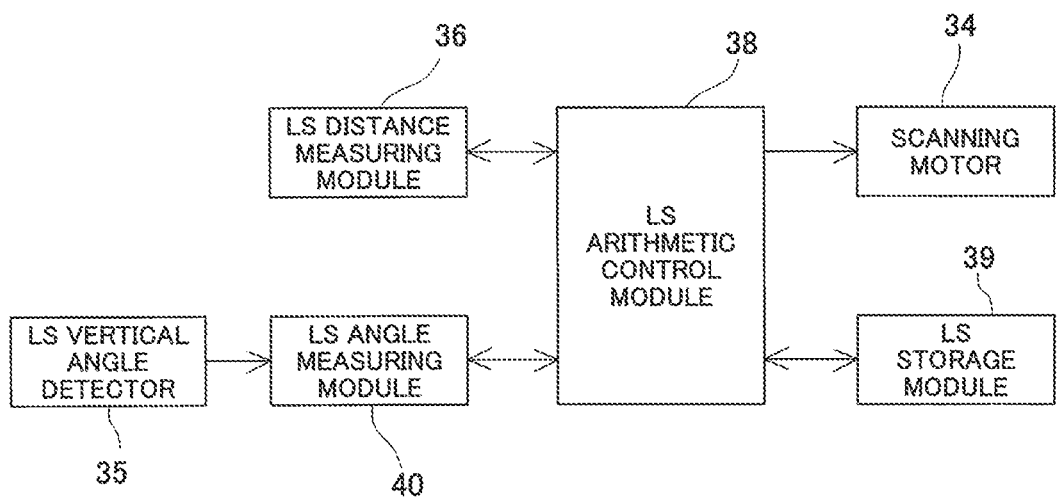
FIG. 5 is a schematic block diagram of a scanner unit of the surveying system.

A Further description will be given on the LS unit 5 by referring to FIG. 5.

The LS unit 5 is mainly constituted of the LS vertical angle detector 35, the LS distance measuring module 36, an LS angle measuring module 40, a laser scanner arithmetic control module (which will be referred to as an LS arithmetic control module 38 hereinafter), the scanning motor 34, and a laser scanner storage module (which will be referred to as an LS storage module hereinafter) 39.

In the LS storage module 39, various types of programs are stored. These programs include: an LS distance measurement program for rotatably irradiating the scanning light 37 emitted from the LS distance measuring module 36 and for performing the distance measurement with respect to each pulsed light, an angle detection program for detecting an angle of the scanning mirror 32 in real time and a data association program for synchronizing or associating various kinds of data as acquired by the TS unit 4 with the data acquired by the LS unit 5. A data storage section is formed in the LS storage module 39, and distance measurement results and angle measurement results (the point cloud data) for respective pulsed lights are stored in the data storage section. It is to be noted that a part of the TS storage module 29 may be allocated to the LS storage module 39.

The LS arithmetic control module 38 develops and executes the programs stored in the LS storage module 39, performs the light emission control of the LS angle measuring module 40, the control of the scanning motor 34 (the rotational control of the scanning mirror 32), and the like, and controls the acquisition of the point cloud data. Further, the LS arithmetic control module 38 associates distance measurement results and an angle measurement results with respect to each of pulsed lights in the data storage section and stores them in the LS storage module 39.

Figure 6:
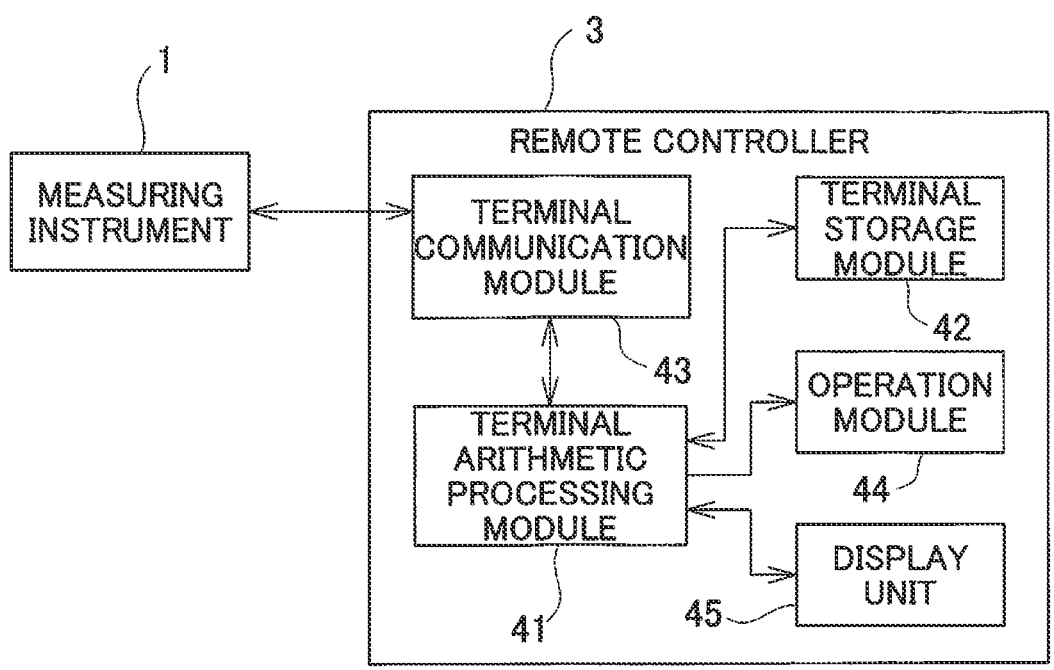
FIG. 6 is a schematic block diagram of a remote controller of the surveying system.

A description will be given on an outline configuration of the remote controller 3 by referring to FIG. 6.

The remote controller 3 has a terminal arithmetic processing module 41 with an arithmetic function, a terminal storage module 42, a terminal communication module 43, an operation module 44, and a display unit 45.

In the terminal storage module 42, various types of programs are stored. These programs include a communication program for communicating with the measuring instrument 1, a display program for displaying operation screen, measurement results, e.g., the point cloud data, images acquired by a camera, and the like, and an operation program for inputting instructions via a touch panel or the like. Further, a data storage section is formed in the terminal storage module 42, and the measurement data (the distance measurement/angle measurement data), the point cloud data and the image data, as transmitted from the measuring instrument 1, can be stored in the data storage region. The terminal arithmetic processing module 41 executes the programs stored in the terminal storage module 42 and controls the terminal communication module 43 or the display unit 45 and the like based on the programs.

The terminal communication module 43 performs the communication with the measuring instrument 1. Further, the operation module 44 inputs various kinds of instructions via buttons or the like of a controller integrally provided with the display unit 45, and remotely operates the measuring instrument 1.

On the display unit 45, measurement results acquired by the TS unit 4, the point cloud data acquired by the LS unit 5, and the like are displayed.

It is to be noted that the entire display unit 45 may be configured as a touch panel. If the entire display unit 45 is a touch panel, the operation module 44 may be omitted.

Figure 7:
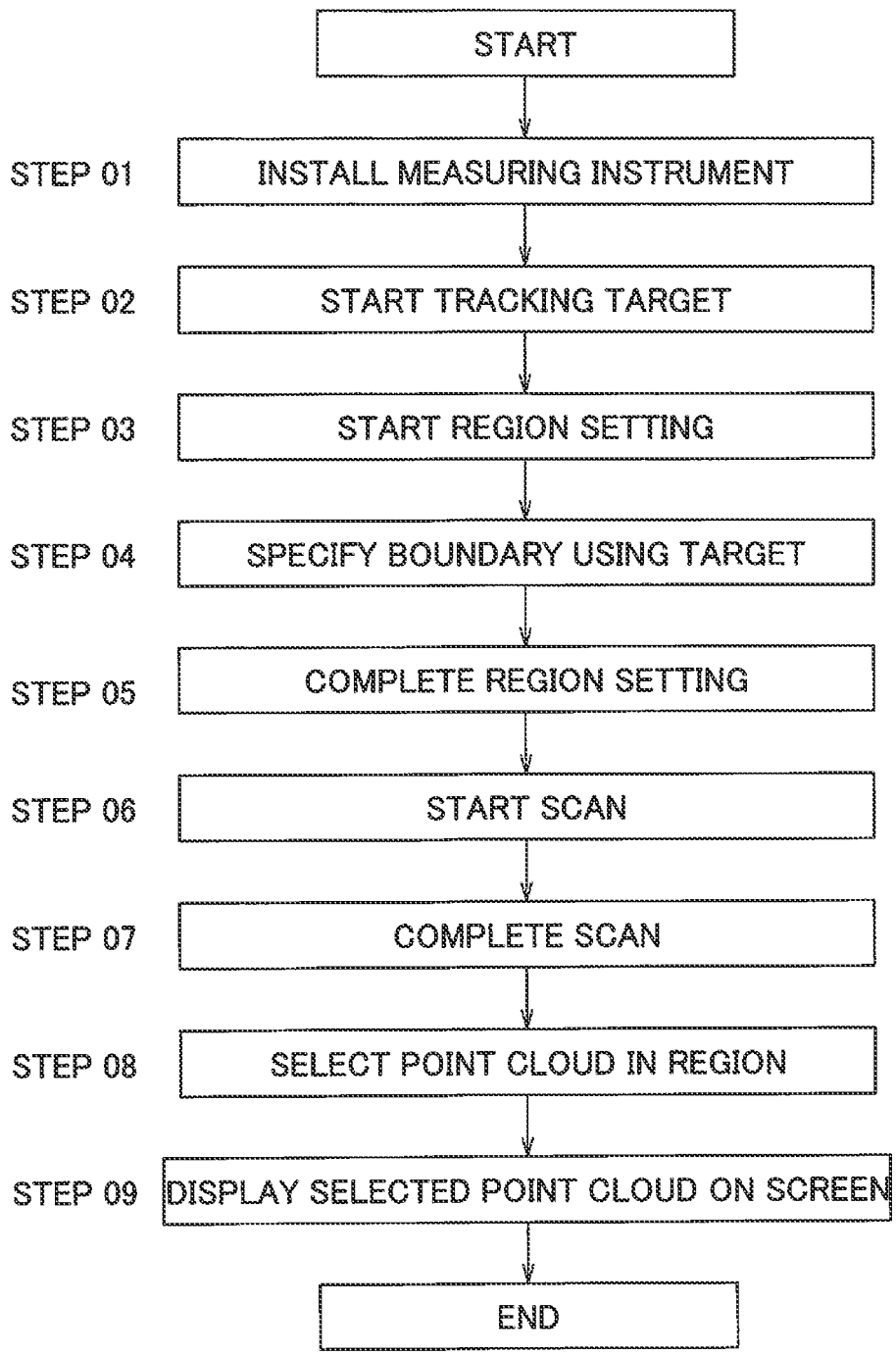
FIG. 7 is a flowchart of operations of this embodiment.

By referring to FIG. 1 and FIG. 7, a description will be given on an operation of a region setting according to the present embodiment.

(STEP 01) The measuring instrument 1 is installed at a predetermined position.

(STEP 02) A worker holds the target 2 and allows the measuring instrument 1 (the TS unit 4) to start tracking the target 2.

(STEP 03) The region setting is started when the target 2 is positioned near the object 6.

(STEP 04) The target 2 is held and moved around the object 6 so that the tracking by the TS unit 4 is not interrupted. As shown in FIG. 1, when moving behind the object 6, the target 2 is supported above the object 6 so that an optical path of the tracking light is not blocked by the object 6. The TS unit 4 performs positional measurements while tracking the target 2.

(STEP 05) A boundary of a region is specified when the target 2 makes a circuit of the object 6. A horizontal projection figure of a locus of the target 2 surrounding the object 6 is a horizontal section, and the region as set is a three-dimensional space (a closed stereoscopic region) which has the horizontal section as a bottom plane and is defined by a height including the object 6. It is to be noted that, if a height of the object 6 is known or finite, the height of the three-dimensional space may be specified by the target 2 or numerically specified from the operation module 26, and the data acquisition region may be a closed three-dimensional space (a closed stereoscopic region). Further, by setting the height vertically above the boundary formed by a tracking locus of the target 2, it is also possible to determine an equipment or the like suspended from a ceiling as the object and to set a region whose lower limit is the tracking locus.

The TS arithmetic control module 21 or the terminal arithmetic processing module 41 acquires a locus (the tracking locus) of the target 2 and calculates the horizontal projection figure and the data acquisition region. Further, the boundary of the data acquisition region is set as a threshold value.

(STEP 06) The TS arithmetic control module 21 sets as a scan range a predetermined range (a horizontal angle) including the data acquisition region based on an instruction from the operation module 26, or the TS arithmetic control module 21 sets the scan range based on the region as acquired and starts scanning by the LS unit 5. It is to be noted that the scan range may be set for an angle of elevation but it may be set for a horizontal angle only. It is to be noted that the scan range may be set by the LS arithmetic control module 38.

(STEP 07) By the cooperation of the rotation of the scanning mirror 32 and the horizontal rotation by the horizontal rotation driver 12, the set predetermined range is scanned and the point cloud data is acquired.

(STEP 08) The TS arithmetic control module 21 compares three-dimensional coordinate values of each measuring point of the acquired point cloud data with the data acquisition region (the threshold value), and selects measuring points with three-dimensional coordinate values included in the data acquisition region. This selection eliminates points which deviate in a horizontal angle direction and in a depth direction from the data acquisition region. It is to be noted that the LS arithmetic control module 38 may perform the selection of the measuring points.

By performing this selection step, the point cloud data as acquired will only be those related to the object 6.

(STEP 09) The TS arithmetic control module 21 or the terminal arithmetic processing module 41 displays the selected point cloud data on the display unit 27 of the measuring instrument 1 or on the display unit 45 of the remote controller 3.

Figure 8:
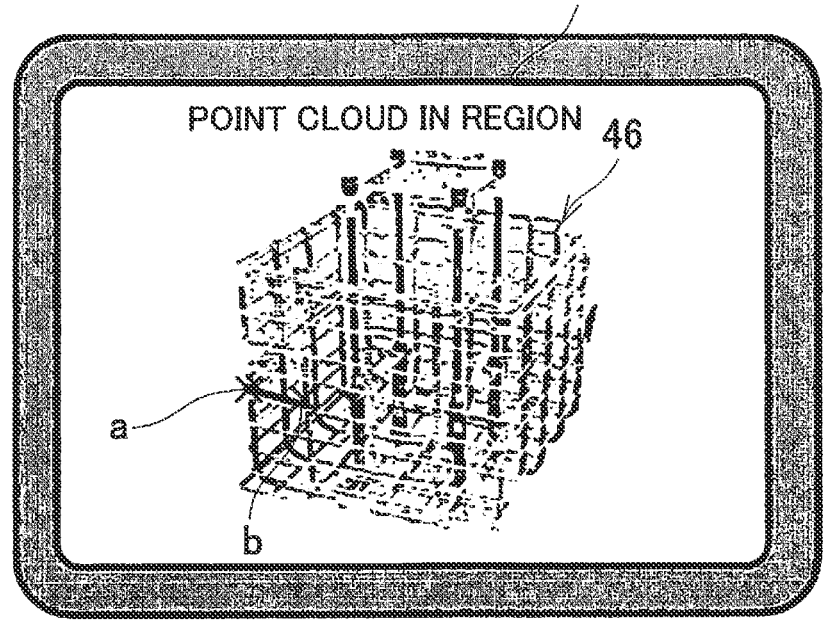
FIG. 8 is a drawing showing an example of a display screen.

FIG. 8 shows a state where point cloud data 46 as acquired is displayed on the display unit 27 or on the display unit 45 as an image. The point cloud data 46 relates to the object 6, it is possible to omit the work of extracting the point cloud data relating the object 6 from the huge amount of point cloud data.

The TS arithmetic control module 21 or the terminal arithmetic processing module 41 specifies a desired point on the displayed image (the point cloud), obtains three-dimensional coordinates of the specified point, and calculates informations of a position and a height of the specified point from the three-dimensional coordinates. Further, by specifying two points (a, b) a distance between the two points (a width, a depth, and the like) is calculated. Therefore, the three-dimensional information with respect to the object 6 can be easily acquired from the image.

In the embodiment as described above, the region is set using the locus obtained by tracking the target 2, but four points are specified on the locus and the region is set in FIG. 1.

Four points on the locus as obtained by moving around the object 6, for instance, positions (points) corresponding to four corners of the object 6 are selected, and a quadrangle formed by connecting the four points with straight lines is determined as a boundary of the region. In this case, likewise, a horizontal projection figure of the quadrangle is determined as a horizontal section of the region, and a three-dimensional space defined by a height including the object 6 is set as the region (the data acquisition region). It is to be noted that the shape of the horizontal section corresponds to the shape of the object 6 without being restricted to the quadrangle, four points or more, five points, or six points may be selected, and a polygon such as a pentagon or a hexagon may be adopted.

When this region setting is adapted, the shape of the region becomes simple, and it becomes easy to determine whether each measuring point of the point cloud data in the STEP 08 is included in the region.

Further, in this method, since the region is formed by a plane, the region setting itself can be facilitated.

Other embodiments of the region setting based on a tracking locus of the target 2 will now be described with reference to FIG. 9, FIG. 10A, FIG. 10B, and FIG. 10C.

Figure 9:
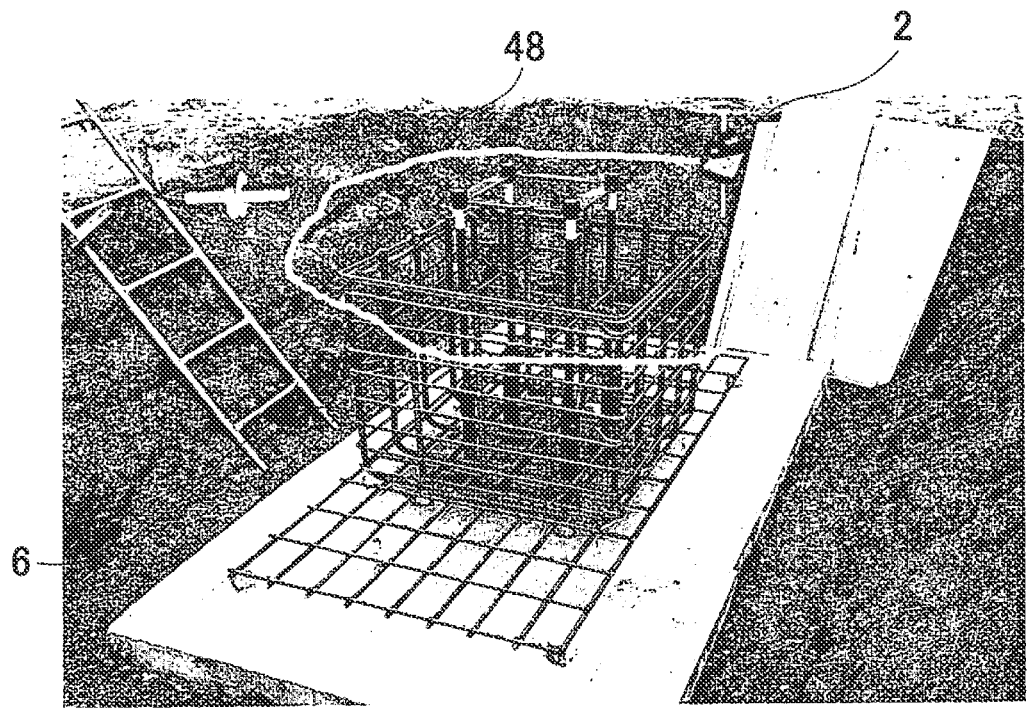
FIG. 9 is an explanatory drawing showing an object and a tracking locus.

In FIG. 9, a reference numeral 48 denotes a locus obtained by tracking the target 2. Further, in FIG. 10A, FIG. 10B, and FIG. 10C, a reference numeral 48' denotes a projected locus 48' obtained by projecting the locus 48 onto a horizontal plane.

Figure 10A:
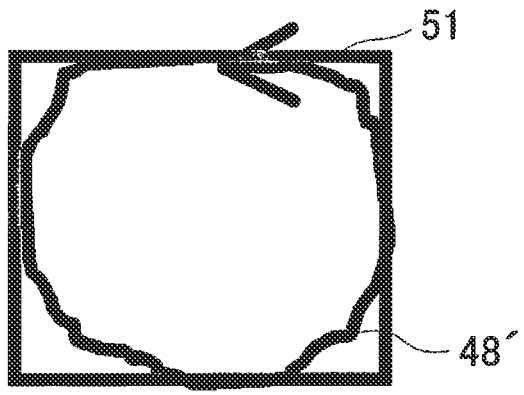
FIG. 10A is an explanatory drawing of setting a circumscribed quadrangle as a data acquisition region relative to the tracking locus.

In a region setting shown in FIG. 10A, the TS arithmetic control module 21 or the terminal arithmetic processing module 41 calculates a circumscribed quadrangle 51 as circumscribed to the projected locus 48', calculates a columnar three-dimensional space with the circumscribed quadrangle 51 as a bottom plane, and determines the three-dimensional space as a data acquisition region.

Figure 10B:
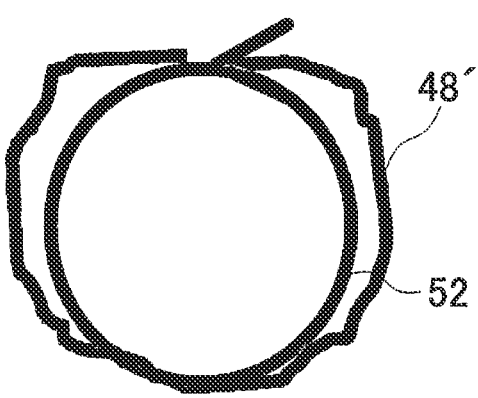
FIG. 10B is an explanatory drawing of setting an inscribed circle as the data acquisition region relative to the tracking locus.

Further, in the region setting shown in FIG. 10B, the TS arithmetic control module 21 or the terminal arithmetic processing module 41 calculates an inscribed circle 52 as inscribed to the projected locus 48', calculates a columnar three-dimensional space with the inscribed circle 52 as a bottom plane, and determines the three-dimensional space as a data acquisition region.

Figure 10C:
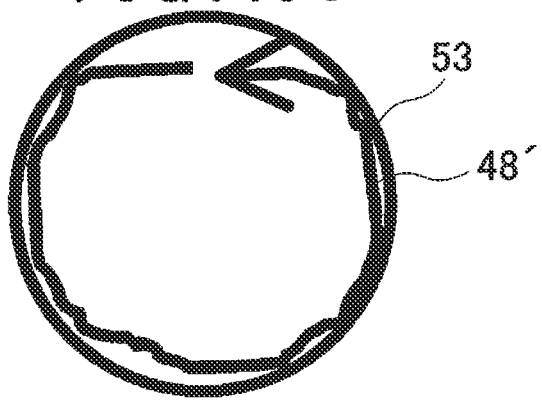
FIG. 10C is an explanatory drawing of setting a circumscribed circle as the data acquisition region relative to the tracking locus.

Further, in the region setting shown in FIG. 10C, likewise, a circumscribed circle 53 as circumscribed to the projected locus 48' is obtained, a columnar three-dimensional space with the circumscribed circle 53 as a bottom plane is calculated, and the three-dimensional space is determined as a data acquisition region.

It is to be noted that, in case of setting the region based on the projected locus 48', a shape of the region to be circumscribed or inscribed is not limited to a rectangle or a circle, but can be a triangle, a parallelogram, an ellipse, or the like. It may be appropriately selected taking a shape, a size, and others of the object into consideration.

FIG. 11, FIG. 12, and FIGS. 13A-13B show other embodiments of the region setting.

In the other region settings, various kinds of region patterns are stored in the TS storage module 29 or the terminal storage module 42 in advance. First, a region shape (a region pattern) is selected from the operation module 26 or the operation module 44, and a plurality of region points are set by the target 2. The region points are measured by the TS unit 4, and a region is set with the use of the measured region points and the selected region pattern. In this region setting example, since measuring the plurality of points by the target 2 can suffice, the region wetting work can be facilitated.

FIG. 11 shows a case where a circular pattern 55 is selected as the region pattern.

Figure 11A:
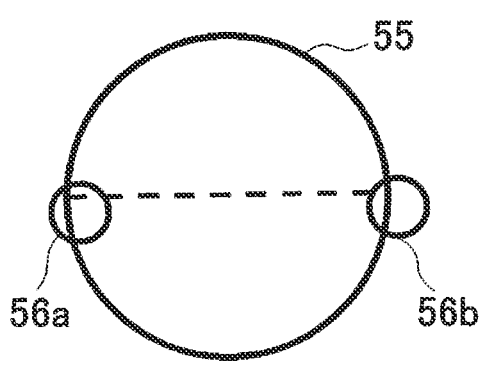
FIG. 11A is an explanatory drawing of specifying two points and determining a diameter of a circle as the data acquisition region.

FIG. 11A shows a case where the circular pattern 55 is formed by specifying a diameter. In this case, the region points to be set are two points (56a, 56b) at both ends of the diameter of the circular pattern 55.

Figure 11B:
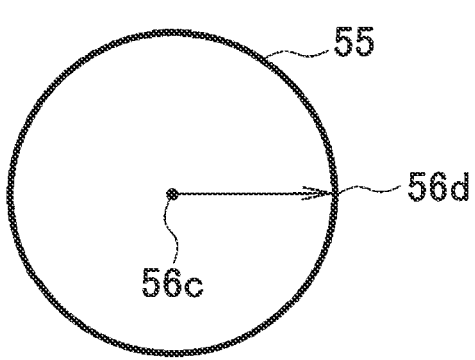
FIG. 11B is an explanatory drawing of specifying two points and determining a center and a radius of the circle as the data acquisition region.

FIG. 11B shows a case where the circular pattern 55 is formed by specifying a center position and a radius by the target 2. In this case, the region points to be set are two points (56c, 56d), which are the center and a tip of the radius of the circular pattern 55. Alternatively, the center position may be specified by the target 2, and a radial distance on a horizontal projection figure may be numerically set from the operation module 26 or the remote controller 3.

FIG. 12 shows a case where a region is set by the circular pattern 55 in FIG. 11A described above. Further, as the object 6, a column is shown. It is to be noted that, when a worker instructs the measuring instrument 1 to perform measuring or the like, an instruction is performed via the remote controller 3.

The target 2 is held in the vicinity of the object 6 at an arbitrary position A capable of being measured by the measuring instrument 1. A position of the target 2 (three-dimensional coordinates) is measured by the measuring instrument 1 (FIG. 12A).

Then, the target 2 is moved to the opposite side of the object 6 and held at a position B. A position of the target 2 (three-dimensional coordinates) is measured. A horizontal distance between the position A and the position B is obtained based on respective horizontal plane coordinates of the three-dimensional coordinates of the position A and on the horizontal plane coordinates of the three-dimensional coordinates of the position B. A circular pattern 55 having the obtained horizontal distance as a diameter is created (FIG. 12B).

A cylindrical three-dimensional space with the circular pattern 55 as a bottom plane is set as a region 57. As to a height, the target 2 may be held at a desired height to be set, a position of the target may be measured and the height is set, or in a case where the height is known in a design drawing or the like a numerical value may be input by the remote controller 3 (FIG. 12C).

FIG. 13A and FIG. 13B show cases where the region pattern is a rectangle.

Further, FIG. 13A shows a case where a square pattern 57 is selected as the region pattern. If the region pattern is the square pattern 57, by setting two diagonal points (58a, 58b) as the region points, the respective region points are measured and the square pattern 57 is created based on measurement results of the two region points. The height setting is the same as for the circular pattern 55 as described above.

FIG. 13B shows a case where a rectangular pattern 57' is selected as the region pattern. In a case where the region pattern is the rectangular pattern 57', by setting three points, which are two diagonal points (58a, 58b) and another vertex angle point (58c), in total as region points, similarly, the respective region points are measured and the rectangular pattern 57' is created based on measurement results of the three region points.

Although the region patterns are circular or rectangular in FIG. 11, FIG. 12, and FIGS. 13A-13B, it is needless to say that various kinds of plane figures such as a polygon, e.g., a triangle or a pentagon or an ellipse can be used as the region patterns.

Figure 14:
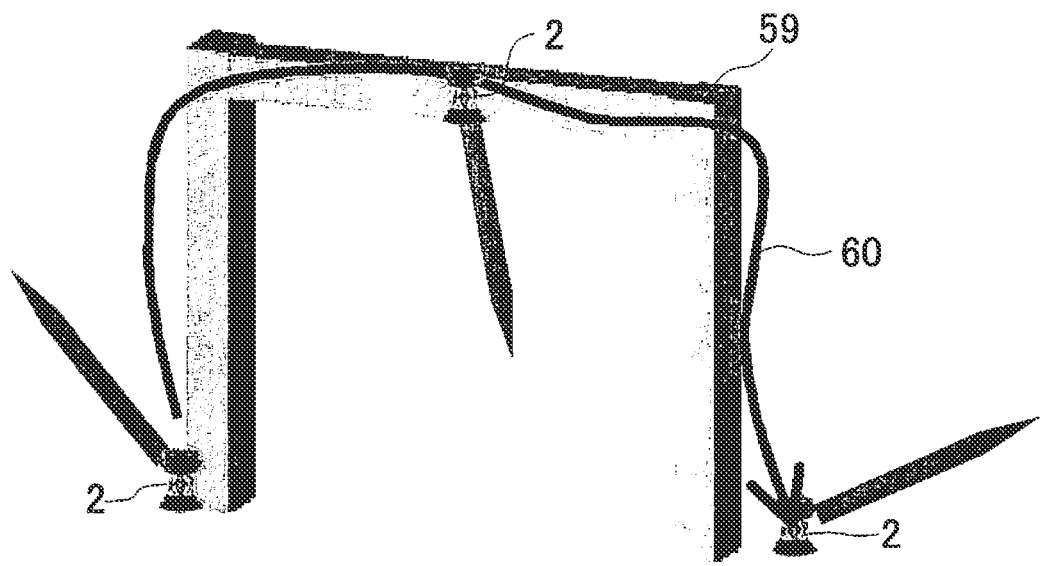
FIG. 14 is an explanatory drawing of a case where a tracking locus along an object is acquired.
Figure 15:
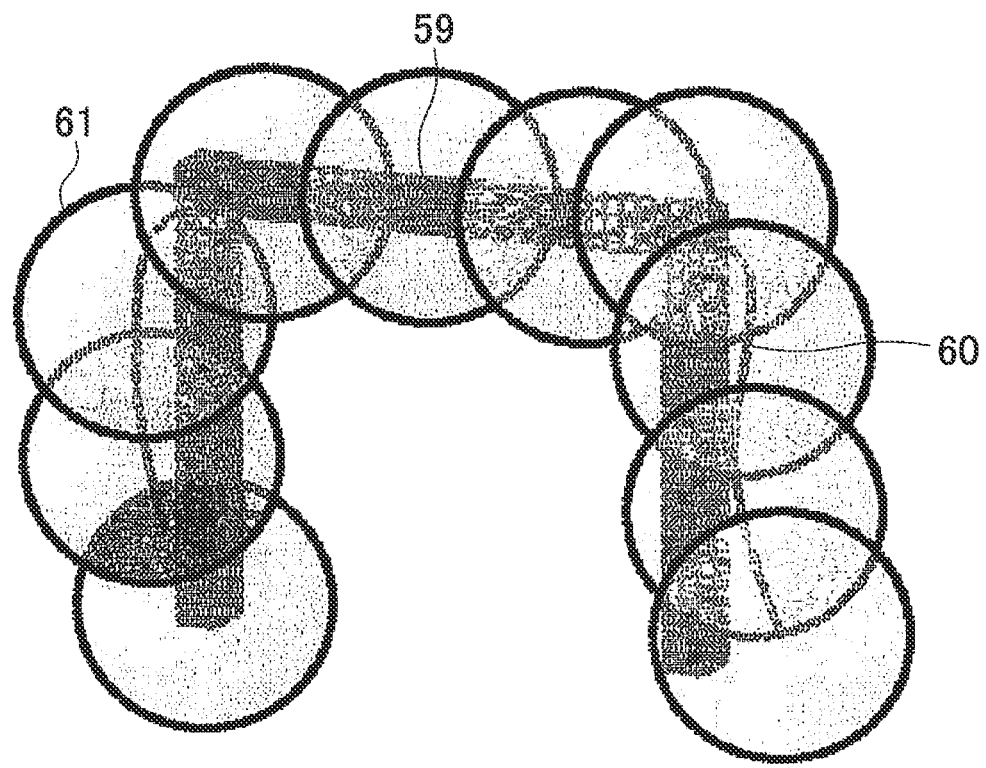
FIG. 15 is an explanatory drawing of a case where the tracking locus is used and the data acquisition region is formed with a spherical pattern.

Next, FIG. 14 shows an embodiment in which the region pattern is not a plane figure but a stereoscopic figure.

Further, in FIG. 14, as an example, a portal frame 59 is the object.

In a state of performing tracking, the target 2 is moved along the portal frame 59. The measuring instrument 1 performs the measurement of the target 2 while tracking the target 2, and measures a locus 60 of the target 2.

As a stereoscopic region pattern, a sphere 61 is selected, and a radius of the sphere 61 is set. A region point is set on the locus 60. The sphere 61 is created with the region point as a center. Further, by setting the region points at a predetermined pitch, the spheres 61 are formed along the locus 60 at a predetermined pitch. Thus, a gathering of spheres 61 forms a region including the portal frame 59. It is to be noted that the sphere 61 may be created for each of the measuring points constituting the locus 60.

Further, the radius may be set either beforehand or afterward. If the radius is set beforehand, the region is created concurrently with the measurement of the locus 60 of the target 2.

Further, in a case where the point cloud data is required with respect to a part of the portal frame 59, for instance, a corner portion of the portal frame 59, a region may be created by the spheres 61 including the corner portion.

The stereoscopic region pattern may be a cube. In this case, when setting a length of one side, a shape of the region is specified.

Figure 16:
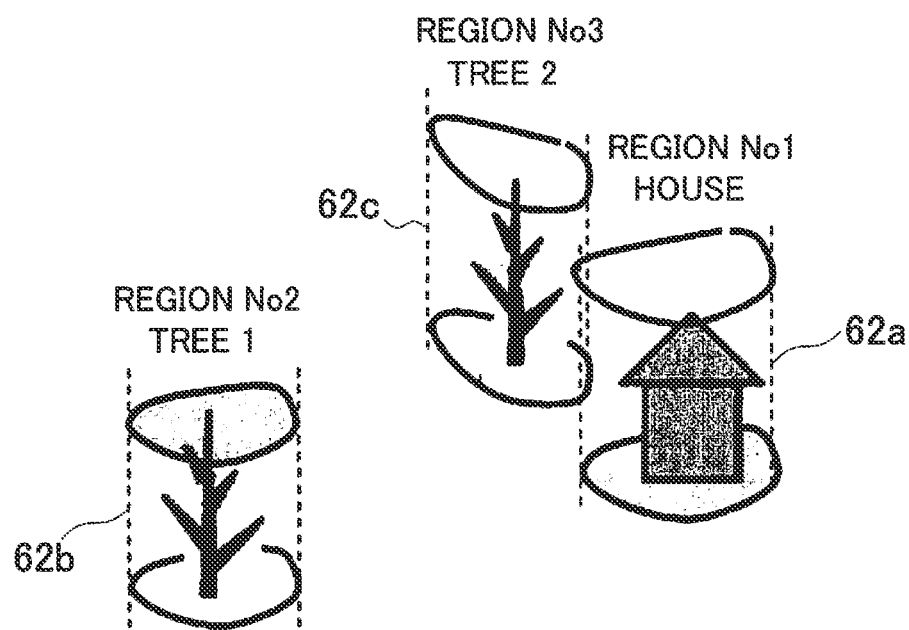
FIG. 16 is an explanatory drawing of case where a plurality of objects are present and data acquisition regions are set for the individual objects.

FIG. 16 shows an example application of the region setting.

In the example application, if a plurality of objects exists, a laser scan range provided by the LS unit 5 is set so that the plurality of objects (House, Tree 1, Tree 2) are included, and the point cloud data of the entire scan range is acquired.

For the respective objects, regions 62a, 62b, 62c are individually set. The point cloud data included in the regions 62a, 62b, 62c are retained, and other point cloud data is deleted from the point cloud data of the entire scan range. By deleting the unnecessary point cloud data, it is easy to observe the objects.

Further, the point cloud with respect to each object can be displayed on the display unit 27 or on the display unit 45.

Figure 17:
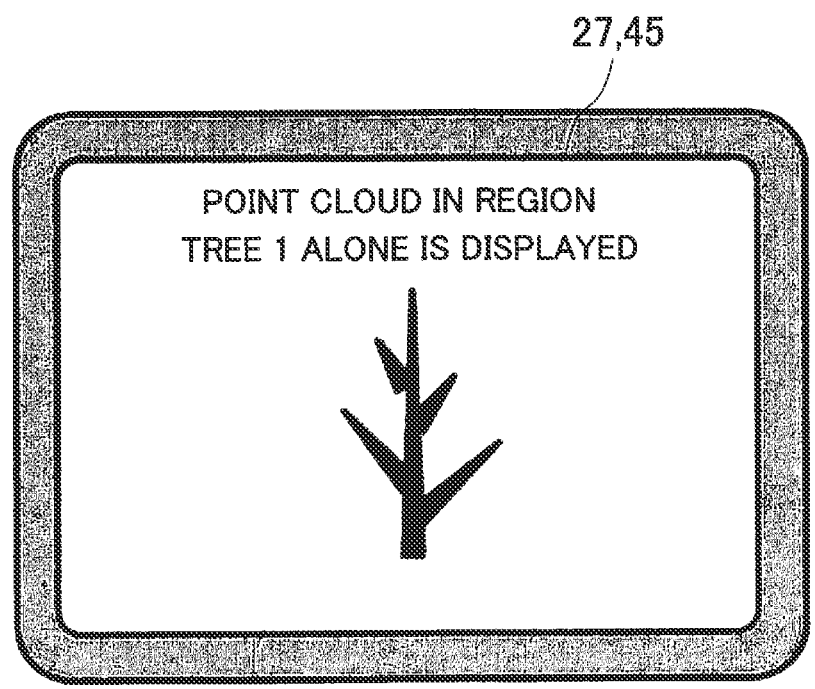
FIG. 17 is an explanatory drawing of a case where the point cloud data of one object is displayed in a display unit.

FIG. 17 shows the object (Tree 1). Individually showing the object (Tree 1) enables the detailed measurement of the individual object.

Figure 18:
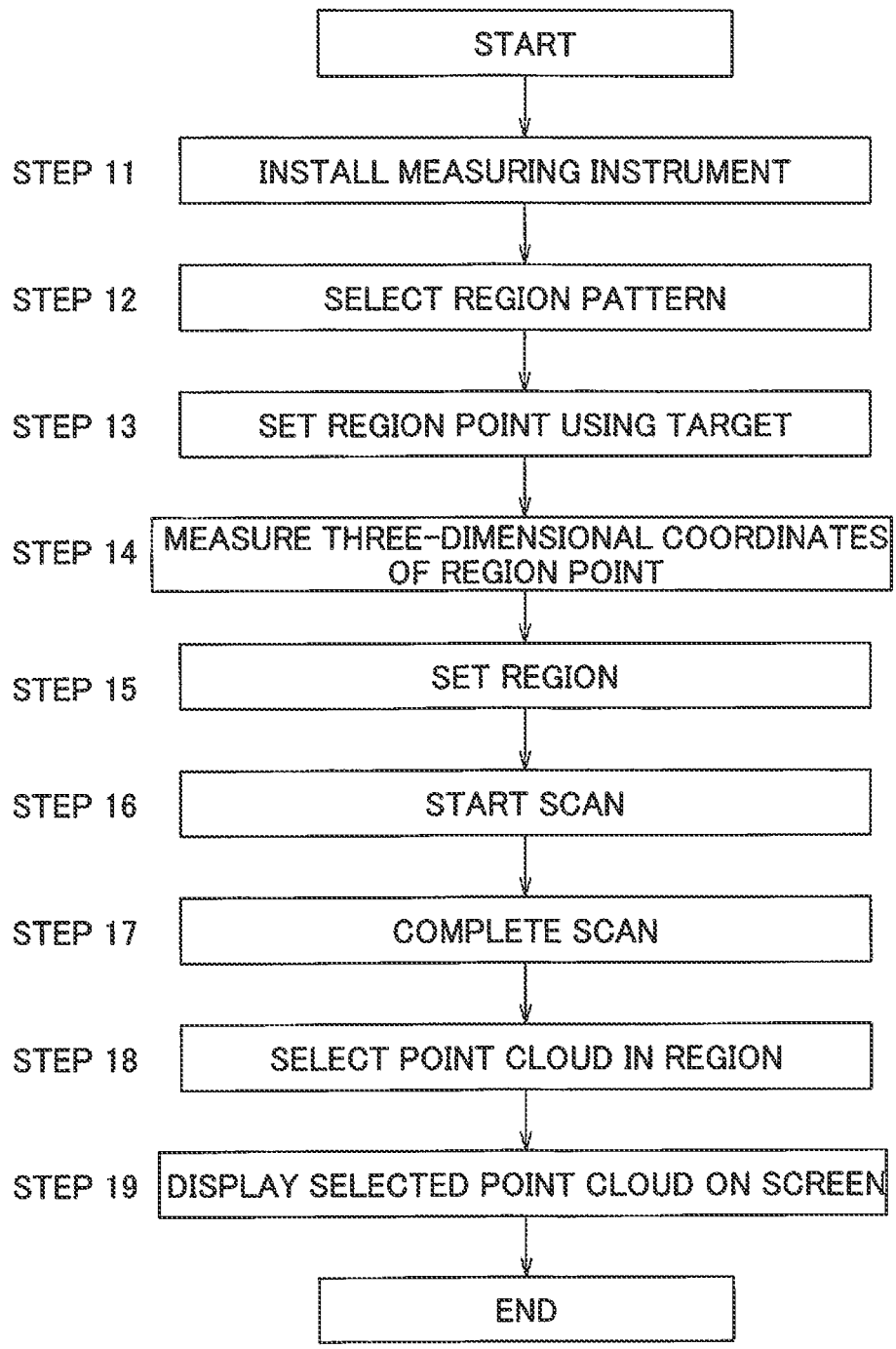
FIG. 18 is a flowchart of operations in the other embodiment.

A description will be given on a function of the region setting of the other embodiment by referring to FIG. 18.

(STEP 11) The measuring instrument 1 is installed at a predetermined position.

(STEP 12) The region pattern (the circular pattern 55, the square pattern 57, the rectangular pattern 57', the sphere 61, or the like) is selected by the operation module 26 of the TS unit 4 or the operation module 44 of the remote controller 3.

(STEP 13, 14) The target 2 is placed in the vicinity of the object 6, the target 2 is measured by the TS unit 4, the target 2 is moved to a different position, and the target 2 is likewise measured. Positions of the target at a plurality of positions are measured and are set as region points.

(STEP 15) The TS arithmetic control module 21 or the terminal arithmetic processing module 41 calculates a horizontal projection figure of a region based on the selected region pattern and three-dimensional coordinates of the set region points. A height of the measurement region is specified, and the region is set.

(STEP 16) A predetermined range (a predetermined horizontal angle) including the region is set as a scan range from the operation module 26 or the operation module 44, or the TS arithmetic control module 21 sets the scan range based on the obtained region, and a scan performed by the LS unit 5 is started.

(STEP 17) By the cooperation of the rotation of the scanning mirror 32 and the horizontal rotation by the horizontal rotation driver 12, the set scan range is scanned and a point cloud data is acquired.

(STEP 18) Three-dimensional values of the respective measuring points of the point cloud data as acquired are compared with the region, and measuring points with the three-dimensional coordinate values as included in the region are selected. This selection eliminates the points deviating in the horizontal direction and the points deviating in the depth direction with respect to the region.

(STEP 19) The TS arithmetic control module 21 or the terminal arithmetic processing module 41 displays the selected point cloud data on the display unit 27 of the measuring instrument 1 or on the display unit 45 of the remote controller 3 as an image.

Based on the displayed image (the point cloud), the detailed measurement with respect to the object 6 is capable of being performed.

It is to be noted that a UAV (an unmanned aerial vehicle) may be added to the surveying system, an omnidirectional prism may be mounted in the UAV as the target 2, the UAV may be moved around the object, the target 2 may be tracked and measured, and the region may be set based on the measurement results.

The invention claimed is:

1. A surveying system comprising: a target and a measuring instrument, wherein said target has retro-reflection characteristics, said measuring instrument comprises a point measuring unit configured to irradiate a distance measuring light to said target, to receive a reflected light and to measure three-dimensional coordinates of said target based on a light receiving result, a scanner unit configured to rotatably irradiate a laser beam and to acquire a point cloud data, and an arithmetic control module, wherein said point measuring unit is configured to measure said target held in the vicinity of an object at at least one position, said arithmetic control module is configured to calculate a region of a three-dimensional space including said object based on a target measurement result of said point measuring unit, said scanner unit is adapted to scan a predetermined range including said object and to acquire the point cloud data, and said arithmetic control module is configured to select the point cloud data only included in said region of said point cloud data.

2. The surveying system according to claim 1, wherein said point measuring unit has a tracking function and tracks a movement of said target around said object, measures said target while tracking and acquires a tracking locus, and said arithmetic control module is configured to calculate said region of said three-dimensional space based on said tracking locus.

3. The surveying system according to claim 1, wherein said point measuring unit has a tracking function and tracks a movement of said target around said object, measures said target while tracking and acquires a tracking locus, and said arithmetic control module is configured to calculate a horizontal projection figure of said tracking locus and calculate a region of said three-dimensional space with said horizontal projection figure as a bottom plane and extending in the vertical direction.

4. The surveying system according to claim 1, wherein said point measuring unit has a tracking function and tracks a movement of said target around said object, measures said target while tracking and acquires a tracking locus, and said arithmetic control module is configured to determine said tracking locus as a boundary, set a height vertically above said tracking locus, and calculate a region of said three-dimensional space.

5. The surveying system according to claim 3, wherein said arithmetic control module is configured to calculate a circle and a polygon inscribed or circumscribed to said tracking locus and to calculate said region of said three-dimensional space based on said inscribed or circumscribed circle and polygon.

6. The surveying system according to claim 4, wherein said arithmetic control module is configured to calculate a circle and a polygon inscribed or circumscribed to said tracking locus and to calculate said region of said three-dimensional space based on said inscribed or circumscribed circle and polygon.

7. The surveying system according to claim 1, wherein said arithmetic control module has a region pattern for setting a region, and said point measuring unit is adapted to measure three-dimensional coordinates of said target as a region point at at least one point in the vicinity of said object, and said arithmetic control module is configured to calculate said region of said three-dimensional space based on a measurement result of said region point and said region pattern.

8. The surveying system according to claim 7, said region pattern is a circle, and said arithmetic control module is configured to determine one region point as a center of said circle and to calculate said region of said three-dimensional space based on a set radius and said region point.

9. The surveying system according to claim 7, wherein said region pattern is a circle, and said arithmetic control module is configured to calculate a distance between two region points from horizontal coordinates of said two region points and to calculate said region of said three-dimensional space with said calculated distance determined as a diameter of said circle.

10. The surveying system according to claim 7, wherein said region pattern is a circle, and said arithmetic control module is configured to determine one point of two region points as a center of said circle, to calculate a distance between two region points from horizontal coordinates, to determine said calculated distance as a radius of said circle and to calculate said region of said three-dimensional space.

11. The surveying system according to claim 7, wherein said region pattern is a square, and said arithmetic control module is configured to calculate a distance between two points from horizontal coordinates of said two points, to determine said calculated distance as a diagonal line of said square and to calculate said region of said three-dimensional space.

12. The surveying system according to claim 7, wherein said point measuring unit is adapted to measure three-dimensional coordinates of said target as region points at at least three points in the vicinity of said object, said region pattern is a rectangle, and said arithmetic control module is configured to determine horizontal coordinates of said three points as coordinates of three vertexes of said rectangle, to calculate said rectangle and to calculate said region of said three-dimensional space based on said calculated rectangle.

13. The surveying system according to claim 7, wherein said point measuring unit has a tracking function, tracks the movement of said target along said object, measures said target while tracking and acquires a tracking locus, and said region pattern is a sphere, and wherein said arithmetic control module is configured to set region points on said tracking locus, to determine said region points as centers of said spheres, and to calculate said region of said three-dimensional space by a gathering of spheres formed along said tracking locus.

14. The surveying system according to claim 1, wherein said arithmetic control module has a plurality of region patterns, said point measuring unit is adapted to measure three-dimensional coordinates of said target as a region point at at least two points in the vicinity of said object, and wherein said arithmetic control module is configured to select one of a plurality of region patterns and to calculate said region of said three-dimensional space based on a measurement result of said region point and said selected region pattern.

15. The surveying system according to claim 14, wherein a plurality of region patterns include at least a circular pattern, a square pattern, a rectangular pattern, and a spherical pattern.

16. The surveying system according to claim 1, wherein said scanner unit is adapted to perform a scan in such a manner that a plurality of objects are included and to acquire the point cloud data, and said arithmetic control module is configured to set said region of said three-dimensional space for each of said objects and to select only the point cloud data included within said region.

17. The surveying system according to claim 1, further comprising a remote controller, wherein at least one of said remote controller or said point measuring unit has a display unit, and said point cloud data included in said region is displayed on said display unit.

18. The surveying system according to claim 17, wherein said point cloud data displayed on said display unit concerns one of the plurality of objects.

19. The surveying system according to claim 18, wherein said display unit is a touch panel and the measurement of said objects is enabled based on said displayed point cloud data.

20. The surveying system according to claim 1, further comprising a UAV, wherein said target is an omnidirectional prism provided on said UAV.

21. A point cloud data acquiring method in a surveying system which comprises a target and a measuring instrument, wherein said target has a retro-reflection characteristics and said measuring instrument has a point measuring unit capable of measuring three-dimensional coordinates of said target while tracking said target and a scanner unit which is integrated with said point measuring unit and is capable of acquiring a point cloud data by rotatably irradiating a laser beam, wherein said point cloud data acquiring method comprises steps of moving said target around an object, acquiring three-dimensional coordinates of said target at least one position while moving, calculating a closed stereoscopic region of a three-dimensional space including said object based on said single three-dimensional coordinates, acquiring the point cloud data including said closed stereoscopic region by said scanner unit, and selecting only point cloud data included in said closed stereoscopic region in said point cloud data.

22. A point cloud data acquiring program which makes the surveying system according to claim 1 to execute the following steps: moving said target around an object, acquiring three-dimensional coordinates of said target at least one position while moving, calculating a closed stereoscopic region of a three-dimensional space including said object based on said single three-dimensional coordinates, acquiring the point cloud data including said closed stereoscopic region by said scanner unit, and selecting only point cloud data included in said closed stereoscopic region in said point cloud data.

* * * * *